(12) United States Patent
Grigor et al.

(10) Patent No.: US 6,618,026 B1
(45) Date of Patent: Sep. 9, 2003

(54) METHOD AND APPARATUS FOR CONTROLLING MULTIPLE DISPLAYS FROM A DRAWING SURFACE

(75) Inventors: Gordon F. Grigor, Toronto (CA); Barry G. Wilks, Markham (CA); Hugo Chung, Scarborough (CA)

(73) Assignee: ATI International Srl, Barbados (BB)

( * ) Notice: Subject to any disclaimer, the term of this patent is extended or adjusted under 35 U.S.C. 154(b) by 0 days.

(21) Appl. No.: 09/183,610

(22) Filed: Oct. 30, 1998

(51) Int. Cl.$^7$ ................................................. G06T 1/00

(52) U.S. Cl. ................................ 345/1; 345/132; 345/3; 345/501

(58) Field of Search ................................. 345/1, 3, 132, 345/501, 507, 522

(56) References Cited

U.S. PATENT DOCUMENTS 5,138,305 A * 8/1992 Tomiyasu ..................... 345/3
6,118,413 A * 9/2000 Bril et al. ..................... 345/3

* cited by examiner

*Primary Examiner*—Kee M. Tung
(74) *Attorney, Agent, or Firm*—Vedder, Price, Kaufman & Kammholz

(57) ABSTRACT

A method and apparatus for controlling multiple displays from a drawing surface begins by obtaining a drawing surface setting that includes at least one of a refresh rate, resolution, and pixel depth. A user may select the drawing surface settings or are default parameters of the computer system. The processing continues by determining whether each of the multiple displays includes a display mode that substantially matches the drawing surface setting. If each of the multiple displays includes a display mode that matches the drawing surface setting, the images stored in the drawing surface are provided to the multiple displays based on the drawing surface setting. As such, the images will be displayed in full, without virtual desktop operation, unless selected by the user. If, however, at least one of the multiple displays does not include a display mode that matches the drawing surface setting, an alternate drawing surface setting is generated, which may be done by modifying the refresh rate, the resolution, and/or the pixel depth of the drawing surface settings. Having generated the alternate surface settings, another determination is made as to whether each of the multiple displays includes a display mode that substantially matches the alternate drawing surface setting. If not, another alternate drawing surface setting is generated until a match is found or until exhausted. If exhausted, one of the displays is dropped from the process, i.e., it operates in a virtual desktop mode, and the process repeats for the remaining displays.

17 Claims, 4 Drawing Sheets

METHOD AND APPARATUS FOR CONTROLLING MULTIPLE DISPLAYS FROM A DRAWING SURFACE

TECHNICAL FIELD OF THE INVENTION

This invention relates generally to video graphics and more particularly to supplying images to multiple displays from a drawing surface.

BACKGROUND OF THE INVENTION

Computers are known to comprise a central processing unit, system memory, audio processing circuitry, peripheral ports, and video processing circuitry. The peripheral ports allow the central processing unit to communicate with peripheral devices such as monitors, printers, external tape drives, the Internet, etc. The video graphics circuitry functions as a co-processor to the central processing unit to perform video graphic functions. As such, the video graphics processor receives graphical data generated by the central processing unit and renders the graphical data into pixel data that is subsequently displayed on a monitor.

The video graphics circuitry may be coupled to a single display or multiple displays. When coupled to a single display, a frame buffer holds the pixel data that will subsequently be provided to the display. Typically, the pixel data is mapped into the frame buffer based on physical parameters of the monitor (e.g., resolution and X-Y coordinates). The mapping of the frame buffer may be linear mapping or tile mapping. Regardless of the mapping techniques, the display presents in a full screen the images stored in the frame buffer.

When the video graphics processing circuit is supplying pixel data to multiple displays, one or more of the displays may be operating in a virtual desktop mode. A display will operated in the virtual desktop mode when its resolution does not match the resolution of one or more of the other multiple displays. Typically, the display operating in the virtual desktop mode has a lower resolution than the other displays, thus it is too small to display the full image of the data stored in the frame buffer. When in the virtual desktop mode, only a portion of the image in the frame buffer is presented on screen. To view other portions of the image, a mouse, or other GUI action is performed.

While the virtual desktop mode allows multiple displays to display the same image from a frame buffer, virtual desktop operations are primarily equipment controlled. In particular, the equipment (i.e., hardware and/or software) selects the resolution for the multiple displays, including those that operate in the virtual desktop mode. Typically, the resolution of the largest display, i.e., the one having the largest resolution, is chosen. As such, the other displays operate in the virtual desktop mode.

As display technology continues to advance, a display may operation in several different modes. For example, the display's resolution may be changed from 640×480 to 720×540, 1024×768, etc., the display's refresh rate may be changed from 60 Hz to 75 Hz, 90 Hz, etc, and the display's pixel depth may be changed from 8 pixels to 16 pixels, 24 pixels, 32 pixels, etc. When such a display is used in a virtual desktop mode, the added modes of operation are not utilized. In addition, a user is not able to select operating modes of multiple displays that are displaying the same images from a frame buffer.

Therefore, a need exists for a method and apparatus that provides greater flexibility to the user in selecting setup options for displaying images on multiple screens.

DETAILED DESCRIPTION OF A PREFERRED EMBODIMENT

Figure 1:
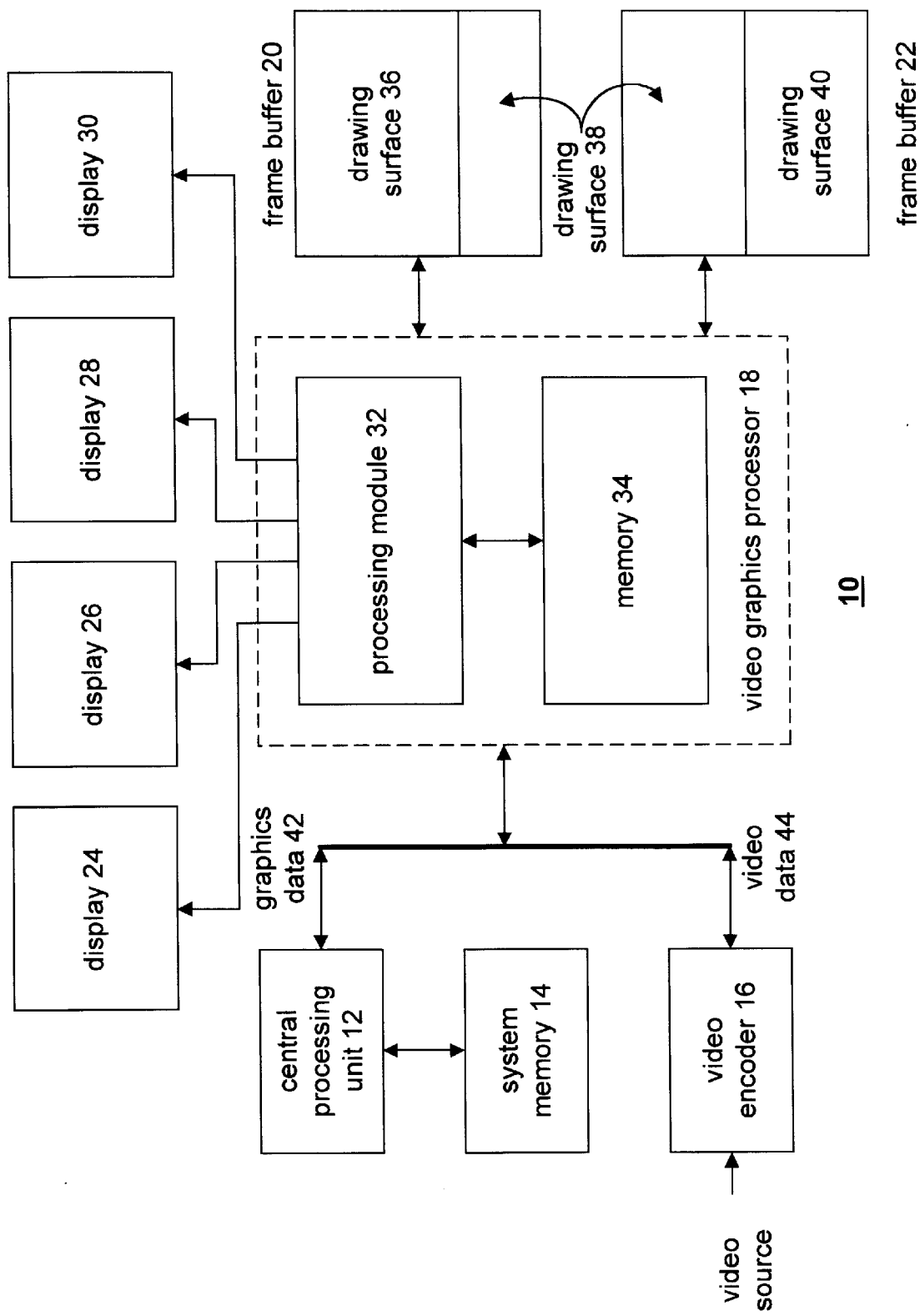
FIG. 1 illustrates a schematic block diagram of a computer system in accordance with the present invention.

Generally, the present invention provides a method and apparatus for controlling multiple displays from a drawing surface. Such processing begins by obtaining a drawing surface setting that includes at least one of a refresh rate, resolution, and pixel depth. A user may select the drawing surface settings or are default parameters of the computer system. The processing continues by determining whether each of the multiple displays includes a display mode that substantially matches the drawing surface setting. If each of the multiple displays includes a display mode that matches the drawing surface setting, the images stored in the drawing surface are provided to the multiple displays based on the drawing surface setting. As such, the images will be displayed in full, without virtual desktop operation, unless selected by the user. If, however, at least one of the multiple displays does not include a display mode that matches the drawing surface setting, an alternate drawing surface setting is generated, which may be done by modifying the refresh rate, the resolution, and/or the pixel depth of the drawing surface settings. Having generated the alternate surface settings, another determination is made as to whether each of the multiple displays includes a display mode that substantially matches the alternate drawing surface setting. If not, another alternate drawing surface setting is generated until a match is found or until exhausted. If exhausted, one of the displays is dropped from the process, i.e., it operates in a virtual desktop mode, and the process repeats for the remaining displays. With such a method and apparatus, an image may be provided to multiple displays based on user selected parameters and provided in full, i.e., without one or more of the displays operating in the virtual desktop mode.

The present invention can be more fully described with reference to FIGS. 1 through 4. FIG. 1 illustrates a schematic block diagram of a computer 10, which may be utilized in a personal computer, work station, video game equipment, video equipment, audio equipment, digital camera, etc. The computer system 10 includes a central processing unit 12, system memory 14, a video encoder 16, a video graphics processor 18, a first frame buffer 20, a second frame buffer 22, and a plurality of displays 24–26. The central processing unit 12 may be a central processing unit as found in a personal computer, or it may be a microprocessor, microcontroller, and/or a microcomputer. The plurality of displays 24–30 may be a computer monitor, flat panel screen, high definition television, a television, LCD panel, and/or any device that displays images.

The computer system 10 also includes a first frame buffer 20 and/or a second frame buffer 22. The first frame buffer 20 stores image data (i.e., pixel data of video and/or graphics data) corresponding to a first drawing surface 36 and image data corresponding to a second drawing surface 38. The second frame buffer 22 stores image data of the remaining portion of the second drawing surface 38 and image data corresponding to a third drawing surface 40. As one of average skill in the art will appreciate, a drawing surface may be stored in a portion of a frame buffer (e.g., representative of a window), in a full frame buffer (representative of full screen), or in more than one frame buffer. As one of average skill in the art will also appreciate, the computer system 10 may include only a single frame buffer having one or more drawing surfaces. Alternatively, the first and second frame buffers 20 and 22 may be configured in a double buffering manner.

The video graphics processor 18 includes a processing module 32 and memory 34. The processing module 32 may be a single processing entity or a plurality of processing entities. Such a processing entity may be a microprocessor, microcontroller, digital signal processor, microcomputer, central processing unit, state machine, logic circuitry and/or any other device that manipulates digital information based on operational instructions. The memory 34 may be a single memory device, or a plurality of memory devices. Such a memory device may be a read-only memory, random access memory, floppy disk memory, reprogrammable memory, magnetic tape memory, hard drive memory, system memory, logic circuitry within a state machine, and/or any other device that stores operational instructions in a digital or analog format.

The video graphics processor 18 is operably coupled to receive video data 44 from the video encoder 16 and/or graphics data 42 from the central processing unit 12. As is generally understood, graphics data 42 relates to images generated by the central processing unit while executing one or more computer applications. Video data 44 relates to digitized representations of video signals received from a television broadcast, cable broadcast, satellite broadcast, DVD player, VCR, and/or camcorder. The video graphics processor 18, based on drawing surface settings, provides the graphics data 42 and/or the video data 44 to a drawing surface of the first or second frame buffer 20 or 22. The video graphics processor 18 provides the images stored in a drawing surface to one or more of the displays 24–30 based on the drawing surface settings. Prior to providing the images to one or more of the displays 24–30, the video graphics processor 18 determines whether each of the displays includes a display mode that substantially matches the drawing surface setting. If so, the images are provided to each of the displays indicated by the drawing surface settings.

If, however, one or more of the displays 24–30 does not include a display mode that matches the drawing surface settings, the video graphics processor 18 alters one or more parameters of the drawing surface settings to generate an alternate drawing surface setting. Having made this change, the video graphics processor 18 determines whether the displays include a display mode that substantially matches the alternate drawing surface settings. If so, the images from the drawings surface are provided to the displays based on the alternate drawing surface settings. If one or more of the displays do not have a display mode that matches the alternate drawing surface settings, the video graphics processor 18 generates another alternate drawing surface setting, which is compared against the another alternate drawing surface settings. If each display does not have a display mode that substantially matches the another alternate drawing surface settings, the graphics processor 18 continues to compare and alter drawing surface settings until a match is found or the alternate drawing surface settings have been exhausted. If the alternate drawing surface settings have been exhausted, the video graphics processor 18 removes one or more of the displays from the group of displays and repeats the above process for the subset of displays. The processing steps performed by the video graphics processor, and in particular the processing module 32 based on the operational instructions stored in memory 34, will be discussed in greater detail with reference to FIGS. 2 through 4.

Figure 2:
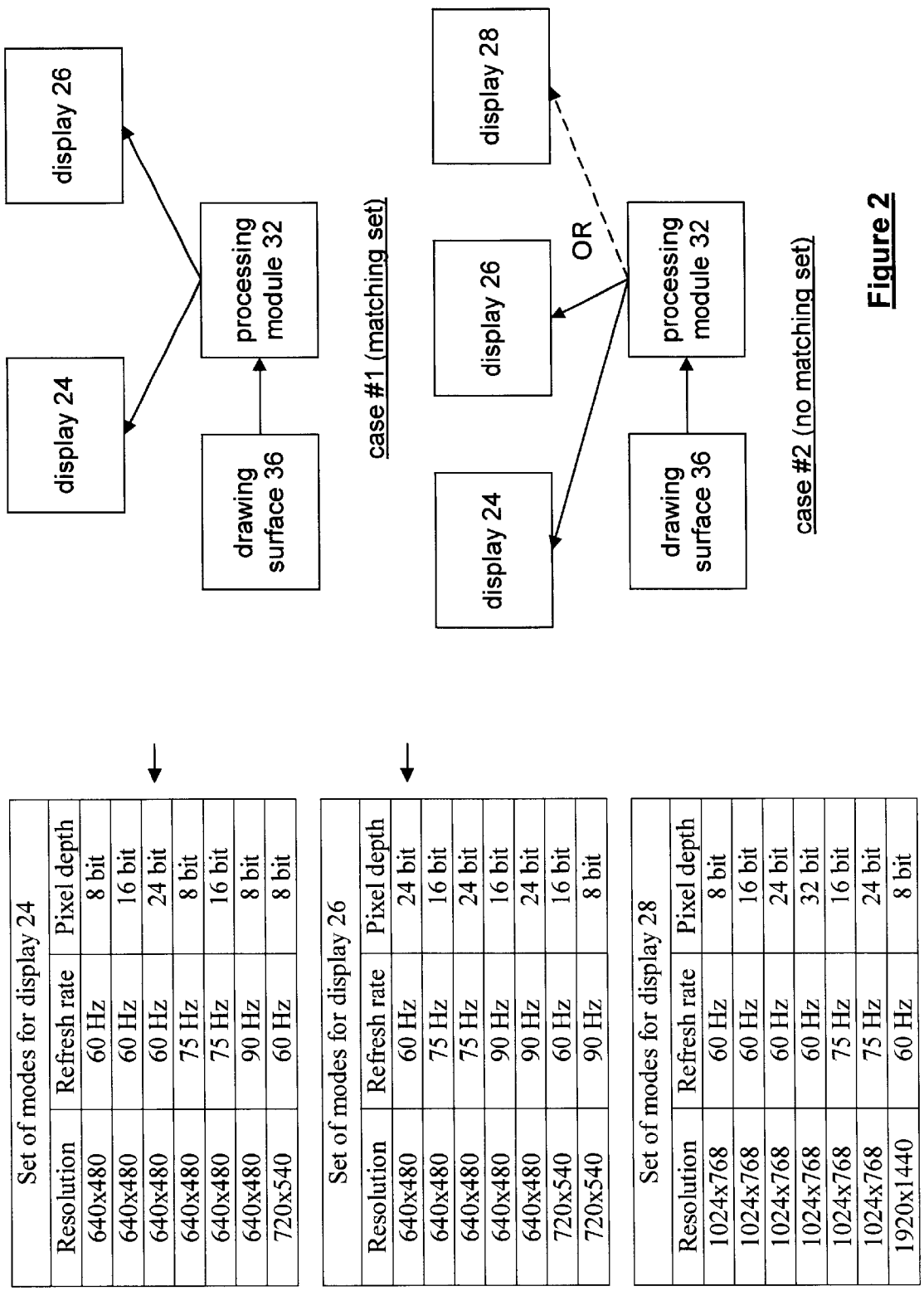
FIG. 2 illustrates a graphical representation of controlling multiple displays from a drawing surface in accordance with the present invention.
Figure 3:
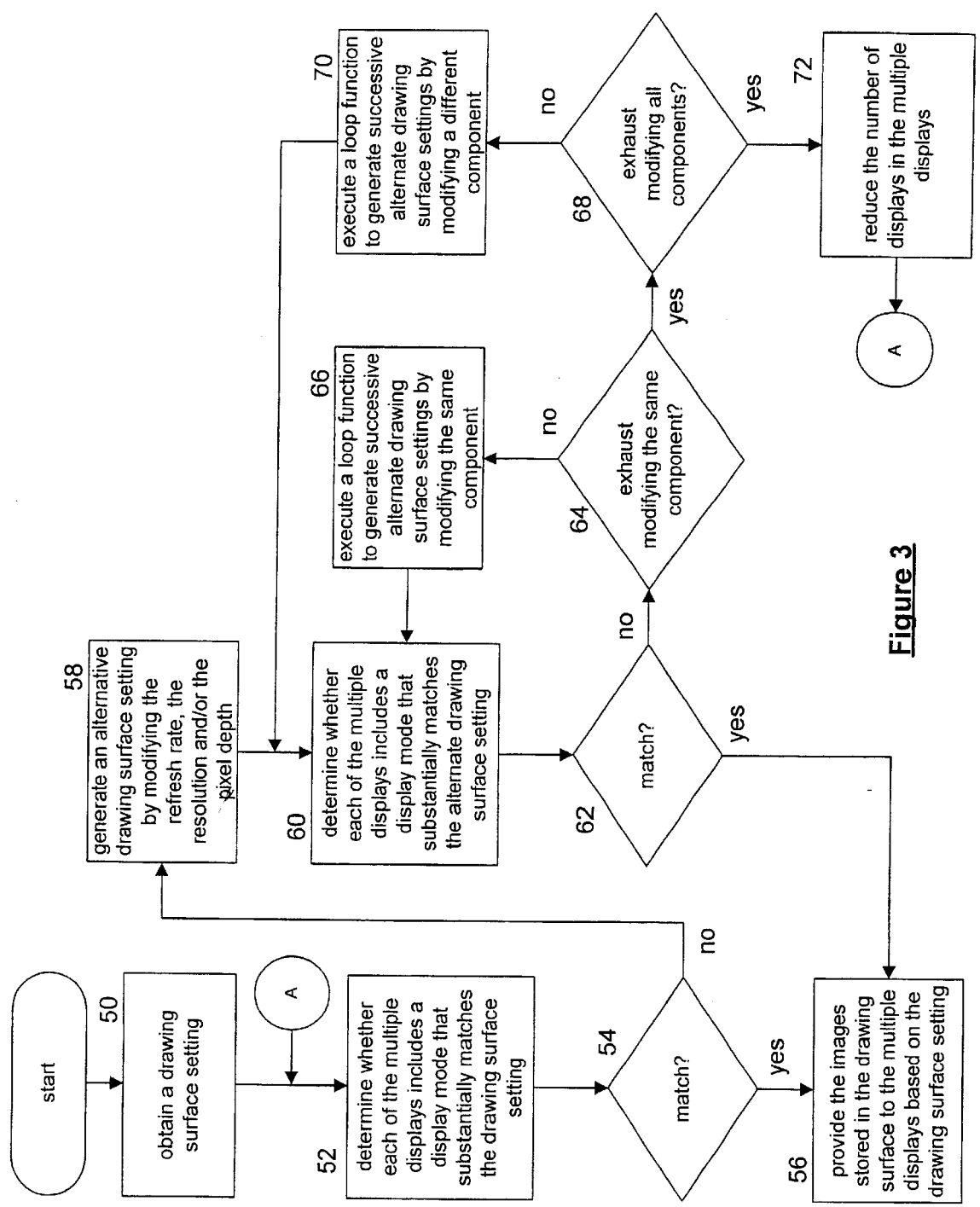
FIG. 3 illustrates a logic diagram of a method for controlling multiple displays from a drawing surface in accordance with the present invention.
Figure 4:
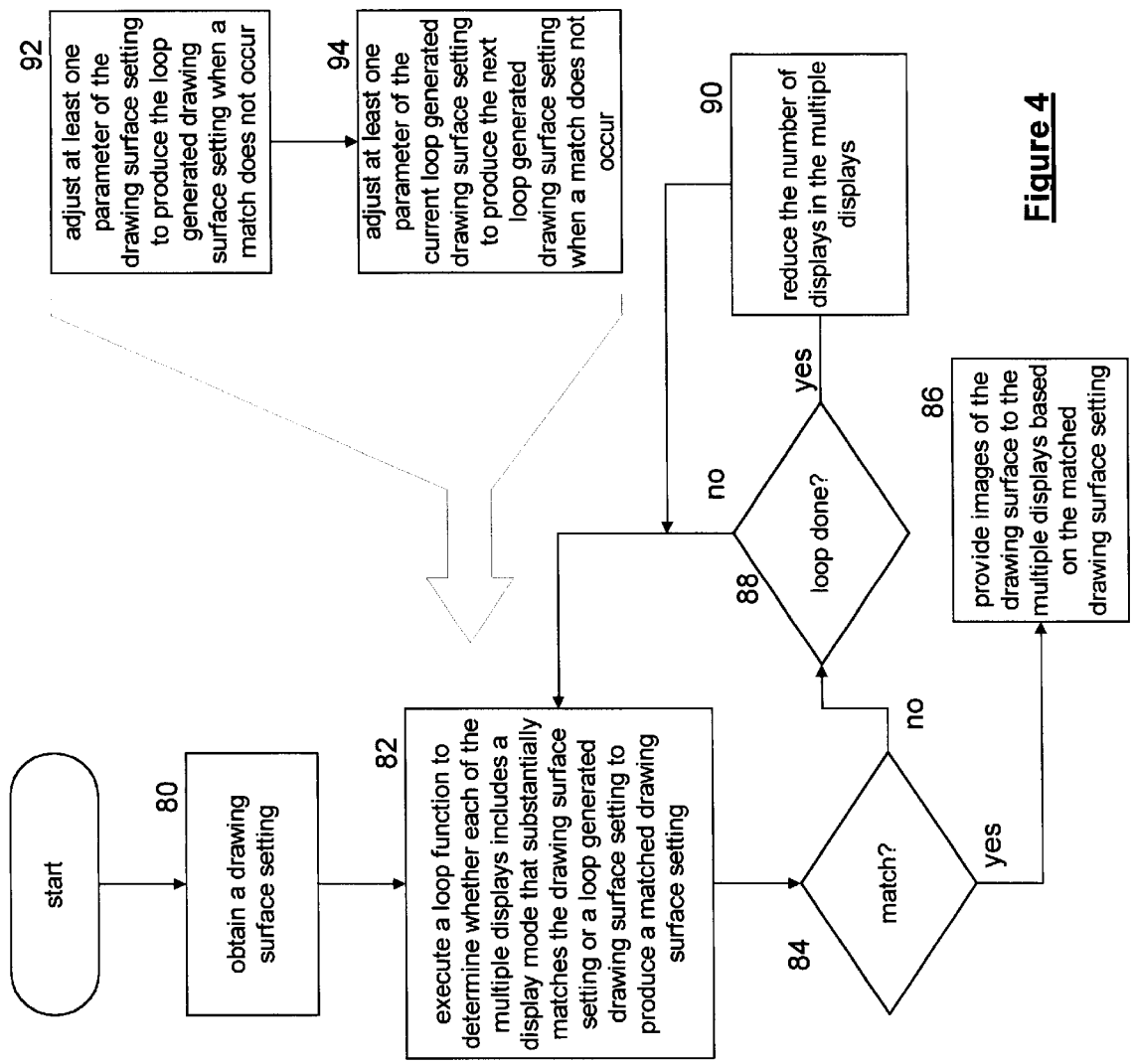
FIG. 4 illustrates a logic diagram of an alternate method for controlling multiple displays from a drawing surface in accordance with the present invention.

FIG. 2 illustrates a graphical representation of controlling multiple displays from a drawing surface. As shown, in tabular form, each of the displays have a set of modes. The set of modes for displays 24, 26, and 28 each include various resolutions, refresh rate and pixel depths. FIG. 2 also illustrates two examples of providing images to multiple displays from a drawing surface. The first case includes providing images from drawing surface 36 to displays 24 and 26. For this example, the processing module 32 coordinates the operation by performing the operational instructions stored in memory 34. The operational instructions correspond to the processing steps as shown in FIGS. 3 and 4. In general, such operational instructions cause the processing module to determine whether, based on a drawing surface setting, each of the displays 24 and 26 have a display mode that matches the drawing surface setting. For example, assume that the user has selected the drawing surface settings to have, or the default drawing surface settings include, a resolution of 640×480, a refresh rate of 60 hertz, and a pixel depth of 24 bits. The processing module scans the set of modes for displays 24 and 26 to determine whether each of the displays includes such a display mode. As can be seen, both include a matching display mode setting. As such, the processing module will provide images from the drawing surface 36 to display 24 and 26 based on the common display mode (i.e., the resolution of 640×480, refresh rate of 60 hertz and a pixel depth of 24 bits).

As a further example of case 1, assume that the initial drawing surface settings included a resolution of 1024×768, a refresh rate of 60 hertz and a pixel depth of 8 bits. The processing module would first determine whether each of the displays 24 and 26 includes a display mode that matches the initial drawing surface settings. As can be seen, both displays 24 and 26 do not include a 1024×768 resolution, a refresh rate of 60 hertz, and a pixel depth of 8 bits display mode. Because no match was found, the processing module will then alter one or more of the parameters (i.e., the resolution, the refresh rate, and/or the pixel depth) and then repeat the search for a match. For example, the processing module would alter the resolution to 720×540 keeping the refresh rate at 60 hertz and the pixel depth at 8 bits. With the alternate drawing surface setting, the processing module would determine whether both displays 24 and 26 include such a setting. As can be seen, both displays 24 and 26 do not include such a display mode. As such, the processing module would continue to alter one or more of the parameters until a match is found or alteration of all parameters has been exhausted. As in this example, the parameters would be adjusted until the 640×480 resolution, the refresh rate of 60 hertz and the pixel depth of 24 bits were selected.

The next example, case 2, shows three displays 24, 26 and 28 being sourced by a single drawing surface 36. As can be seen from the tables of the set of modes for displays 24, 26 and 28, there are no common display modes. As such, the processing module would exhaust the altering of a parameter of the drawing surface setting. When the options of altering the drawing surface settings have been exhausted, the processing module then removes one or more of the displays from the group. In this case, the processing module may remove display 28, or remove displays 24 and 26. If display 28 is removed, the processing module 32 would perform a similar searching function for a matching display mode settings as done with respect to case 1. If displays 24 and 26 are removed, the processing module 32 would attempt to select the display mode for display 28 that most closely matches the drawing surface setting. Note that the drawing surface setting may be provided as user preferences, default parameters of the computer system, or a combination of both.

FIG. 3 illustrates a logic diagram of a method for controlling multiple displays from a drawing surface. Such processing steps may be implemented as programming instructions and/or operational instructions that are stored in memory 34 and executed by processing module 32. The process begins at step 50 where a drawing surface setting is obtained. The drawing surface setting includes a refresh rate, a resolution and/or pixel depth. Such information relates to display parameters and the resulting quality of the images presented thereon. The process then proceeds to step 52 where a determination is made as to whether each of the multiple displays includes a display mode that substantially matches the drawing surface setting, which was described with reference to FIG. 2. The process then proceeds to step 54 where the flow of the process branches as a result of the determination of step 52. If a match occurs, the process proceeds to step 56 where the images stored in the drawing surface are provided to the multiple displays based on the drawing surface settings. For example, if the drawing surface settings include a resolution of 640×480, a refresh rate of 60 hertz and pixel depth of 16 bits, each of the displays would receive data corresponding to these parameters. In addition, each display would reconfigure based on the drawing surface settings to display the image in full screen or in a window as established by the drawing surface.

If, however, a match was not found at step 54, the process proceeds to step 58. At step 58, an alternate drawing surface setting is generated by modifying the refresh rate, the resolution and/or the pixel depth of the drawing surface setting. The process then proceeds to step 60 where a determination is made as to whether each of the multiple displays includes a display mode that substantially matches the alternate drawing surface setting. At step 62, the process branches depending on the outcome of the determination at step 60. If a match occurs, the process proceeds to step 56, which was discussed above.

If, however, a match does not occur as a result of the determination of step 60, the process proceeds to step 64. At step 64, a determination is made as to whether the component and/or parameter that was modified at step 58 has been modified to exhaustion. For example, if the resolution was the parameter that was modified at step 58, step 64 is asking whether all of the resolution options (e.g., 640×480; 720× 540; 1024×768; 1920×1440, etc.) have been utilized as the alternate drawing surface setting. If not, the process proceeds to step 66 where a loop function is executed to generate successive alternate drawing surface settings by modifying the same component. Continuing with the example of modifying the resolution, each potential resolution is modified based on the loop function.

The process then proceeds to step 60 where a repeat determination is made as to whether each of the multiple displays includes a display mode that substantially matches the newly-generated alternate drawing surface setting. If so, the process proceeds to step 56.

If, at step 64, the same component has been modified to exhaustion, the process proceeds to step 68. At step 68 a determination is made as to whether all combinations of resolution, refresh rate, and pixel depth have been utilized as the alternate drawing surface setting. If not, the process proceeds to step 70 to execute a loop function to generate successive alternate drawing surface settings by modifying a different component. Having done this, the process repeats at step 60.

If, however, all components have been modified to exhaustion without a match, the process proceeds to step 72. At step 72, the number of displays in the multiple displays is reduced. Having reduced the number of displays, the process repeats at step 52. If the reduced subset of displays fails to find an alternate drawing surface setting that matches the display mode of the subset of multiple displays, the number of displays in the subset is further reduced until a match is found. Note that the display removed from the multiple displays may be determined based on user preferences and/or default parameters. Such default parameters may include determining which display has the most unique set of modes. In other words, which display has the least overlapping set of modes with the other displays.

FIG. 4 illustrates a logic diagram of an alternate method for controlling multiple displays from a drawing surface. The processing steps of FIG. 4 may be implemented as operational instructions and/or programming instructions stored in memory 34 and executed by processing module 32. The process begins at step 80 where a drawing surface setting is obtained. The process then proceeds to step 82 where a loop function is executed to determine whether each of the multiple displays includes a display mode that substantially matches the drawing surface setting or a loop generated drawing surface setting to produce a matched drawing surface setting. For the purposes of the present invention, a substantial match shall include figures that are within a percentage of the particular modes. For example, a refresh rate of 60 hertz could considered a substantial match of a refresh rate of 59.94 hertz.

The loop function of step 82 is further described with reference to steps 92 and 94. At step 92, at least one parameter of the drawing surface setting is adjusted to produce the loop generated drawing surface setting when a match does not occur. As previously mentioned, a parameter of the drawing surface setting is the resolution, refresh rate and/or pixel depth of a display mode. The process then proceeds to step 94 where at least one parameter of the current loop generated drawing surface setting is adjusted to produce the next loop generated drawing surface setting when a match does not occur.

The process then proceeds to step 84 where a determination is made as to whether a match was found at step 82. If so, the process proceeds to step 86 where images of the drawing surface are provided to the multiple displays based on the matched drawing surface setting. If no match was found at step 84, the process proceeds to step 88. At step 88, a determination is made as to whether the execution of the loop function is complete. If not, the process continues at step 82 until the loop function is complete.

Once the loop function is complete and no matches have been found, the process proceeds to step 90 where the number of displays of multiple displays is reduced to produce a subset of multiple displays. The process repeats at step 80 for the subset of multiple displays until a match is found. If no match is found for a subset of multiple displays, the number of displays in the subset is reduced and the process is repeated.

The preceding discussion has presented a method and apparatus for controlling multiple displays from a drawing surface. As such, a user is provided with greater flexibility in providing a single image to multiple displays. In addition, by matching the display modes of the multiple displays, a more uniform quality of images is presented on this displays. In addition, no floating is required of the images on the multiple displays as is the case with the virtual desktop mode.

What is claimed is:

1. A method for controlling multiple displays from a drawing surface, the method comprises the steps of:
   a) obtaining a drawing surface setting that include at least one of: refresh rate, resolution, and pixel depth;
   b) determining whether each of the multiple displays includes a display mode that substantially matches the drawing surface setting;
   c) when at least one of the multiple displays does not include a display mode that substantially matches the drawing surface setting, generating an alternate drawing surface setting by modifying at least one of: the refresh rate, the resolution, and the pixel depth of the drawing surface setting;
   d) determining whether each of the multiple displays includes a display mode that substantially matches the alternate drawing surface setting; and
   e) when each of the multiple displays includes a display mode that substantially matches the alternate drawing surface setting, providing images stored in the drawing surface to the multiple displays based on the alternate drawing surface setting.

2. The method of claim 1, wherein step (c) further comprises when each of the multiple displays includes a display mode that substantially matches the drawing surface setting, providing the images stored in the drawing surface to the multiple displays based on the drawing surface setting.

3. The method of claim 1, wherein step (e) further comprises when at least one of the multiple displays includes a display mode that does not substantially match the alternate drawing surface setting, executing a loop function to generate successive alternate drawing surface settings by modifying the at least one of the refresh rate, the resolution, and the pixel depth until exhausted or until a substantial match is obtained.

4. The method of claim 3 further comprises executing another loop function to generate the successive alternate drawing surface settings by modifying another one of the refresh rate, the resolution, and the pixel depth until exhausted or until a substantial match is obtained.

5. The method of claim 1 further comprises:
   reducing number of displays in the multiple displays to produce a subset of the multiple displays when no substantial match is found between the alternate drawing surface settings and the display modes of the multiple displays; and
   repeating steps (b) through (e) for the subset of the multiple displays.

6. The method of claim 5 further comprises further reducing the number of displays when the display mode of at least one of the subset of the multiple displays does not substantially match the alternate drawing surface settings.

7. The method of claim 5 further comprises determining which of the multiple displays to include in the subset of the multiple displays based on at least one of: default parameters and user preferences.

8. A method for controlling multiple displays from a drawing surface, the method comprises the steps of:
   a) obtaining a drawing surface setting that includes at least one of: refresh rate, resolution, and pixel depth;
   b) executing a loop function to determine whether each of the multiple displays includes a display mode that substantially matches the drawing surface setting or a loop generated drawing surface setting to produce a matched drawing surface setting; and
   c) when each of the multiple displays includes a display mode that substantially matches the drawing surface setting or the loop generated drawing surface setting, providing images of the drawing surface to the multiple displays based on the matched drawing surface setting.

9. The method of claim 8, wherein the loop functions comprises:
   adjusting at least one parameter of the drawing surface setting to produce the loop generated drawing surface setting when at least one of the multiple displays does not include the display mode that substantially matches the drawing surface setting; and
   adjusting at least one parameter of a current loop generated drawing surface setting to produce a next loop generated drawing surface setting when at least one of the multiple displays does not include the display mode that substantially matches the current loop generated drawing surface setting.

10. The method of claim 8, wherein the loop function comprises: reducing a number of displays in the multiple displays when at least one of the multiple displays includes a display mode that does not substantially matches the drawing surface setting or the loop generated drawing surface setting.

11. A video graphics processor comprises:
    processing module operable to produce video graphics data, wherein the video graphics data is stored in a drawing surface of a frame buffer memory; and
    memory operably coupled to the processing module, wherein the memory stores operational instructions that cause the processing module to (a) obtain a drawing surface setting that include at least one of: refresh rate, resolution, and pixel depth; (b) determine whether each of a plurality of displays includes a display mode that substantially matches the drawing surface setting; (c) generate an alternate drawing surface setting by modifying at least one of: the refresh rate, the resolution, and the pixel depth of the drawing surface setting when at least one of the plurality of displays does not include a display mode that substantially matches the drawing surface setting; (d) determine whether each of the plurality of displays includes a display mode that substantially matches the alternate drawing surface setting; and (e) provide images stored in the drawing surface to the plurality of displays based on the alternate drawing surface setting when each of the plurality of displays includes a display mode that substantially matches the alternate drawing surface setting.

12. The video graphics processor of claim 11, wherein the memory further comprises operational instructions that cause the processing module to provide the images stored in the drawing surface to the plurality of displays based on the drawing surface setting when each of the plurality of displays includes a display mode that substantially matches the drawing surface setting.

13. The video graphics processor of claim 11, wherein the memory further comprises operational instructions that cause the processing module to execute a loop function to generate successive alternate drawing surface settings by modifying the at least one of the refresh rate, the resolution, and the pixel depth until exhausted or until a substantial match is obtained when at least one of the plurality of displays includes a display mode that does not substantially match the alternate drawing surface setting.

14. The video graphics processor of claim 11, wherein the memory further comprises operational instructions that cause the processing module to:

reduce number of displays in the plurality of displays to produce a subset of displays when no substantial match is found between the alternate drawing surface settings and the display modes of the plurality of displays; and repeating operational instructions (b) through (e) for the subset of displays.

15. A video graphics processor comprises:

processing module operable to produce video graphics data, wherein the video graphics data is stored in a drawing surface of a frame buffer memory; and memory operably coupled to the processing module, wherein the memory stores operational instructions that cause the processing module to (a) obtain a drawing surface setting that includes at least one of: refresh rate, resolution, and pixel depth; (b) execute a loop function to determine whether each of a plurality of displays includes a display mode that substantially matches the drawing surface setting or a loop generated drawing surface setting to produce a matched drawing surface setting; and (c) provide images of the drawing surface to the plurality of displays based on the matched drawing surface setting when each of the plurality of displays includes a display mode that substantially matches the drawing surface setting or the loop generated drawing surface setting.

16. The video graphics processor of claim 15, wherein the memory further comprises operational instructions that cause the processing module to perform the loop functions by:

adjusting at least one parameter of the drawing surface setting to produce the loop generated drawing surface setting when at least one of the plurality of displays does not include the display mode that substantially matches the drawing surface setting; and adjusting at least one parameter of a current loop generated drawing surface setting to produce a next loop generated drawing surface setting when at least one of the plurality of displays does not include the display mode that substantially matches the current loop generated drawing surface setting.

17. The video graphics processor of claim 15, wherein the memory further comprises operational instructions that cause the processing module to perform the loop functions by:

reducing a number of displays in the plurality of displays when at least one of the plurality of displays includes a display mode that does not substantially matches the drawing surface setting or the loop generated drawing surface setting.

* * * * *